United States Patent
Garesché et al.

[11] Patent Number: 5,429,326
[45] Date of Patent: Jul. 4, 1995

[54] SPLICED LAMINATE FOR AIRCRAFT FUSELAGE

[75] Inventors: Carl E. Garesché, New Kensington, Pa.; Gerandus H. J. J. Roebroeks, Den Bommel, Netherlands; Buwe V. W. Greidanus, Delft, Netherlands; Rob C. V. Oost, Heerjansdam, Netherlands; Jan W. Gunnink, Nieuwerkerk a/d Ijssel, Netherlands

[73] Assignee: Structural Laminates Company, New Kensington, Pa.

[21] Appl. No.: 910,938

[22] Filed: Jul. 9, 1992

[51] Int. Cl.$^6$ ............................................. B64C 1/00
[52] U.S. Cl. .................... 244/133; 244/119; 244/123; 428/189; 428/77; 156/304.1; 156/157; 156/547
[58] Field of Search ............... 244/119, 158, 120, 123, 244/124, 131, 132, 133, 118.2; 428/189, 77, 213, 215, 216; 156/304.1, 157, 547, 549, 502; 280/610

[56] References Cited

U.S. PATENT DOCUMENTS

| | | | |
|---|---|---|---|
| 2,112,183 | 3/1938 | Ullevoldsaeter | 280/610 |
| 2,356,809 | 8/1944 | Andreef | 280/610 |
| 2,819,032 | 1/1958 | Detrie et al. | 244/133 |
| 3,058,704 | 10/1962 | Bergstedt | 244/133 |
| 3,855,811 | 12/1974 | Sauerbrunn et al. | 428/77 X |
| 3,928,692 | 12/1975 | Pellegrino | 428/77 X |
| 4,128,677 | 12/1978 | Hoelzinger | 428/189 |
| 4,156,054 | 5/1979 | Gurewitsch | 428/583 |
| 4,489,123 | 12/1984 | Schijve et al. | 428/213 |
| 4,500,589 | 2/1985 | Schijve et al. | 428/213 |
| 4,851,071 | 7/1989 | Gallimore | 244/133 |
| 4,943,030 | 7/1990 | Fischer | 280/610 |
| 4,992,323 | 2/1991 | Vogelesang et al. | 428/215 |
| 5,039,571 | 8/1991 | Vogelesang et al. | 428/213 |
| 5,160,771 | 11/1992 | Lambing et al. | 426/57 |

FOREIGN PATENT DOCUMENTS

| | | | |
|---|---|---|---|
| 0183980 | 3/1963 | Sweden | 428/189 |
| 0559954 | 3/1944 | United Kingdom | 244/119 |
| 1375863 | 11/1974 | United Kingdom | 244/119 |

*Primary Examiner*—Mitchell J. Hill
*Assistant Examiner*—Christopher Ellis
*Attorney, Agent, or Firm*—Glenn E. Klepac

[57] ABSTRACT

A laminated body panel for aircraft applications comprises first and second metal layers and an adhesive layer. First and second sections in each metal layer are generally coplanar and separated by a splice line. A first splice line in a first metal layer is generally parallel to a second splice line in a second metal layer, and spaced laterally from the second splice line. An adhesive layer between the metal layers preferably contains reinforcing fibers bridging across the splice lines. An aircraft fuselage or wing or empennage made with spliced body panels of the invention has fewer joints and weighs less than one made with narrower body panels containing unspliced metal layers.

37 Claims, 7 Drawing Sheets

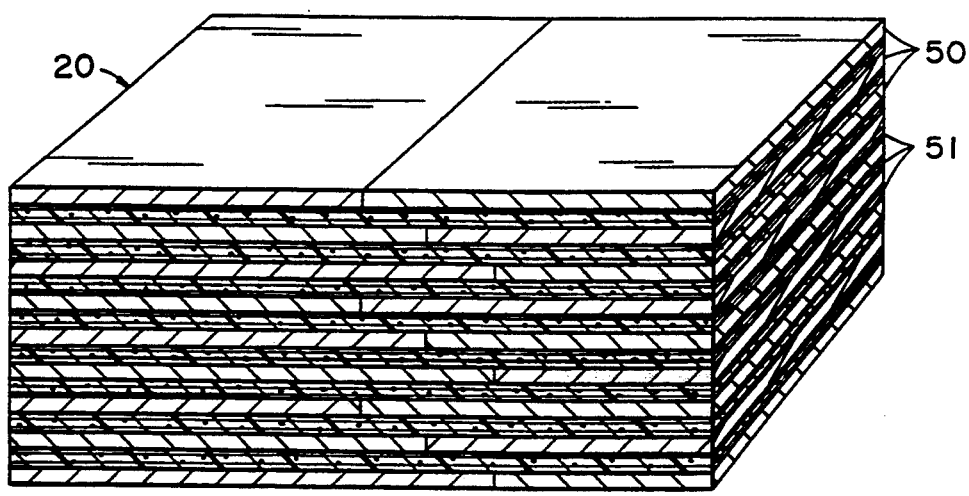
FIG. 6
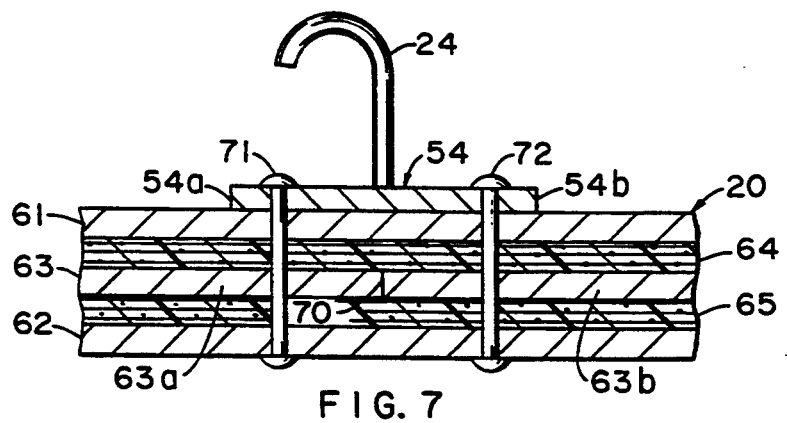
FIG. 7
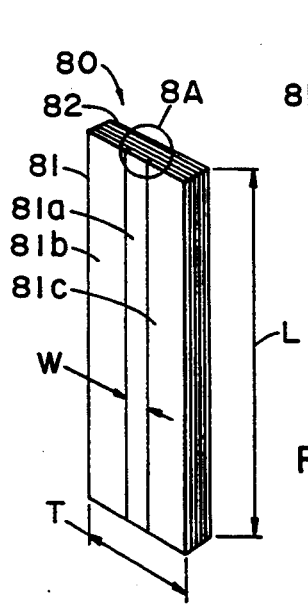
FIG. 8
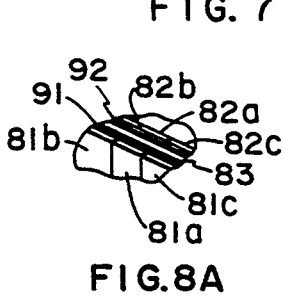
FIG. 8A
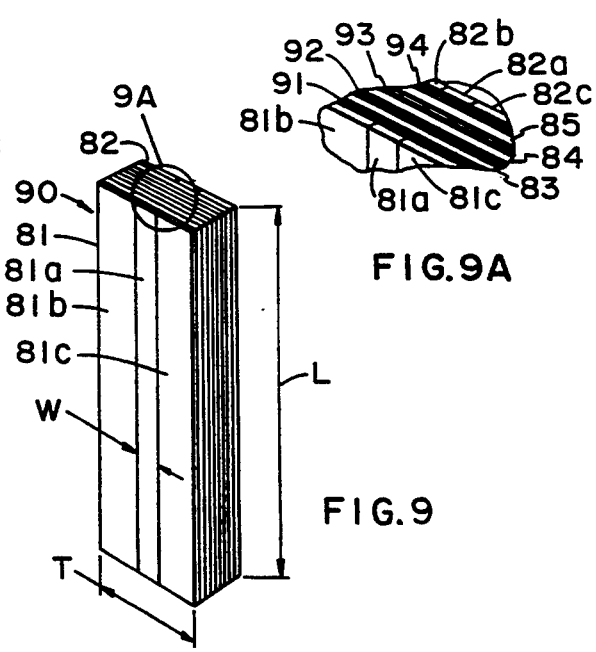
FIG. 9
FIG. 9A

SPLICED LAMINATE FOR AIRCRAFT FUSELAGE

FIELD OF THE INVENTION

The present invention relates to laminated metal-polymer-metal panels suitable for aircraft applications. More particularly, the invention relates to splicing such laminated panels in order to reduce the number of joints between adjacent panels in an aircraft fuselage or wing or empennage.

BACKGROUND OF THE INVENTION

Metal-polymer laminates for aircraft applications are known in the prior art. For example, Schijve et al U.S. Pat. Nos. 4,489,123 and 4,500,589 disclose laminates reinforced with aromatic polyamide fibers, and Vogelesang et al U.S. Pat. No. 5,039,571 discloses a laminate reinforced with S2-glass fibers. These laminates are being accepted for some aircraft applications because they generally have better mechanical properties and lower specific gravity than aluminum alloys. In addition, they are available at lower cost than fiber-reinforced polymer matrix composites.

Metal-polymer laminates for aircraft applications are presently limited to a maximum width of approximately 152 centimeters (60 inches). This maximum width results from the fact that metal sheet material in the specific alloys, tempers and thicknesses needed for aircraft laminates is restricted by present manufacturing technology to a maximum width of only about 152–165 centimeters (60–65 inches).

The weight of an aircraft fuselage increases in direct relationship with the number of joints between adjacent body panels in the fuselage. The number of joints is inversely related to the width of the body panels. Accordingly, increasing the width of aircraft body panels by splicing or otherwise will directly reduce the fuselage weight.

Although the desirability of splicing adjacent laminated panels to increase their width is readily apparent, until the present invention, there has not yet been developed a satisfactory technique for increasing the width of such panels without detrimentally affecting their mechanical properties.

A principal objective of the invention is to provide a laminated metal-polymer body panel for aircraft applications made with spliced metal layers and having satisfactory mechanical properties. Surprisingly, spliced laminates of the invention have increased residual strength compared with unspliced laminates.

It is a related objective of the present invention to provide an aircraft structure such as a fuselage or wing or empennage, made with laminated metal-polymer body panels and having reduced weight.

Another objective of the invention is to provide an aircraft structure made with laminated metal-polymer body panels and having satisfactory mechanical properties.

Additional objectives and advantages of the present invention will become apparent to persons skilled in the art from the following detailed description.

SUMMARY OF THE INVENTION

In accordance with the present invention, there is provided an aircraft fuselage comprising a plurality of frame members supporting a plurality of generally longitudinally extending stringers. A plurality of longitudinally and circumferentially extending body panels are attached to the frame, preferably by through fasteners which are rivets in a preferred embodiment. Body panels of the invention may also be attached to the wings or empennage by utilizing analogous techniques.

The body panels are metal-polymer laminates made with two or more metal layers and an adhesive layer between each of the metal layers. Adjacent metal layers in the laminate are generally laterally coextensive. In other words, the metal layers are generally coextensive in both the longitudinal and circumferential directions when the panels are attached to an aircraft frame. The laminates are preferably generally rectangular and contain 2 to about 20 metal layers and about 1 to about 19 adhesive layers. The metal layers are less than about 1.5 mm thick, preferably less than 1 mm, more preferably about 0.1–0.9 mm, and most preferably about 0.2–0.5 mm. In a preferred embodiment, the metal layers have a thickness of about 0.3 mm (0.012 inch).

The metal layers may be made from a metal having a tensile strength of more than 0.20 GPa. Some suitable metals are aluminum alloys, steel alloys, titanium alloys, copper alloys, magnesium alloys and aluminum matrix composites. Aluminum-copper alloys of the AA2000 series, aluminum-zinc alloys of the AA7000 series and aluminum-magnesium-silicon alloys of the AA6000 series are preferred. Some particularly preferred alloys are AA2024 aluminum-copper; AA7075 aluminum-zinc and AA6013 aluminum-magnesium-silicon.

The adhesive layers are made from synthetic polymers such as epoxy resins, unsaturated polyesters, vinyl esters, phenolic resins and thermoplastic resins. Epoxy resins are particularly preferred.

The adhesive layers are similar in thickness to the metal layers. The adhesive layers are less than about 1.5 mm thick, preferably less than 1 mm, more preferably about 0.1–0.9 mm and most preferably about 0.2–0.5 mm. Adhesive layers of about 0.3 mm (0.012 inch) thickness are utilized in a preferred embodiment.

The adhesive layers are preferably reinforced with continuous fibers of a material such as glass, aromatic polyamides ("aramids") and carbon. The preferred glass fibers are S-2 glass or R-glass fibers each containing about 58–69 wt. % $SiO_2$, 18–29 wt. % $Al_2O_3$ and 7–19 wt. % MgO. Also suitable are less expensive E-glass fibers which contain about 55 wt. % $SiO_2$, 15 wt. % $Al_2O_3$, 19 wt. % CaO, 7 wt. % $B_2O_3$ and 3 wt. % MgO. One suitable aramid fiber is made from poly-para-phenyleneterephthalamide. The fibers may have a modulus of elasticity of about 60–650 GPa and an elongation at break of about 0.2–8%. The fibers are preferably continuous filaments each having a diameter of about 3–30 microns.

A preferred laminate is reinforced with S-2-glass fibers in the adhesive layers. The S-2 glass fibers preferably have a diameter of about 8–12 microns, and they make up about 35–75% of the total volume of adhesive and fiber in the adhesive layers.

Unspliced metal-polymer laminates containing materials similar to those utilized in the present invention are disclosed in Schijve et al U.S. Pat. Nos. 4,489,123 and 4,500,589 and Vogelesang et al U.S. Pat. Nos. 4,992,323 and 5,039,571. The Schijve et al patents cover laminates made with aluminum alloy sheets, a thermohardening adhesive layer and aromatic polyamide fibers. Vogelesang et al U.S. Pat. No. 4,992,323 covers a laminate provided with a synthetic thermoplastic layer which may contain a polyarylate, polysulphone, polyethersulphone, polyetherimide, polyphenylene ether, polyphenylene sulphide, polyether-ether ketone, polyether ketone, polyether ketone-ketone or a liquid crystal polymer. Vogelesang et al U.S. Pat. No. 5,039,571 covers metal-polymer laminates reinforced with S-2-glass fibers. The disclosures of these Schijve et al and Vogelesang et al patents are incorporated herein by reference, to the extent consistent with the present invention.

At least one of the fuselage body panels has a width greater than about 165 centimeters (65 inches). More preferably, the panel width is at least about 300 centimeters (118 inches). In a particularly preferred embodiment, the panel width is about 305 centimeters (120 inches). As used herein, the term "width" may refer either to the longitudinal dimension of the panels or to their circumferential dimension when they are attached to an aircraft fuselage.

Aluminum alloy metal layers in the laminates usually have a maximum width of about 60 inches (152.4 centimeters). In order to provide greater width in the body panels, the metal layers are manufactured in sections. At least one of the metal layers includes a first section, a second section generally coplanar with the first section, and a splice line between the sections.

The body panels of the invention preferably include a first metal layer comprising first and second sections having a first splice line between them and a second metal layer comprising first and second sections having a second splice line between them. The first and second splice lines are preferably generally parallel and spaced apart by a distance of at least several centimeters. More preferably, the parallel splice lines are spliced apart by at least 10 centimeters or 20 centimeters.

There may also be a third metal layer between the first and second metal layers and comprising first and second sections separated by a third splice line. When the third splice line is generally parallel to the first and second splice lines, it should be spaced from both the first and second splice lines by at least several centimeters and preferably by at least 10 centimeters or 20 centimeters.

The adhesive layers preferably contain glass fibers bridging the splice lines. The glass fibers are generally uninterrupted adjacent the splice lines. The fibers may be oriented in one direction or in groups corresponding to several different directions, depending upon the loading condition of the structure. Preferably, at least about one-half of the fibers extend perpendicular to splice lines in adjacent metal layers. In a particularly preferred embodiment, about one-half of the fibers are oriented in a 0° (longitudinal) direction and about one-half are oriented in a 90° (circumferential) direction. Alternatively, about one-third of the fibers may be oriented at 0° and about two-thirds at 90° or about two-thirds may be oriented at 0° and about one-third at 90°.

In an alternative embodiment, the third splice line in the third metal layer may extend generally parallel to the fuselage longitudinal axis and transverse or perpendicular to the other splice lines. When the third splice line extends longitudinally, the body panel should be joined to a stringer in the frame by fasteners on opposite sides of the third splice line. For example, a stringer having a base straddling the third splice line will be joined to the panel with a first through fastener joining the first section in the third layer to the base and with a second through fastener joining the second section in the third layer to the base. The through fasteners are preferably rivets.

BRIEF DESCRIPTION OF THE DRAWINGS

FIG. 6 is a perspective view of a spliced laminate of the invention.

FIG. 7 is a fragmentary cross-sectional view of an aircraft fuselage.

FIGS. 8 and 9 are perspective views of test specimens of metal-polymer laminates.

FIGS. 8A and 9A are enlarged, fragmentary views of the circled portions of laminates shown in FIGS. 8 and 9, respectively.

DETAILED DESCRIPTION OF A PREFERRED EMBODIMENT

Figure 1:
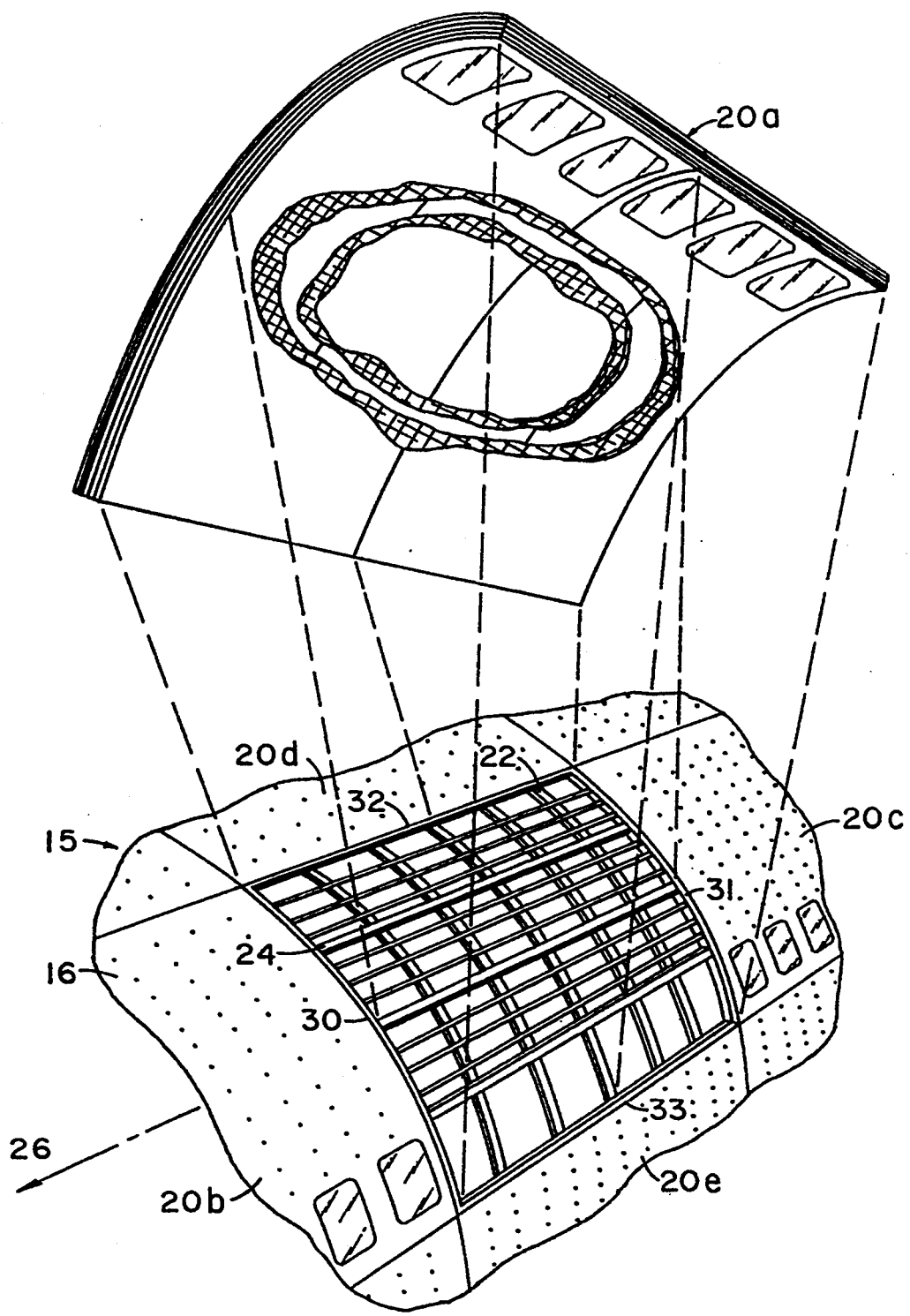
FIG. 1 is an exploded fragmentary perspective view of an aircraft fuselage made in accordance with the present invention.

There is shown in FIG. 1 an aircraft 15 having a fuselage 16 made with several body panels or skin panels 20 of the present invention. The aircraft 15 has a frame which includes circumferentially extending frame members 22 and longitudinally extending stringers 24 supported by the frame members 22. The body panels 20 are spaced outwardly from a principal or longitudinal axis 26 of the fuselage 16.

The first body panel 20a shown in FIG. 1 adjoins a second body panel 20b along a first lateral joint 30. Similarly, a second lateral joint 31 joins the first body panel 20a to a third body panel 20c. In addition, a fourth body panel 20d joins the first panel 20a along a first longitudinal joint 32, and a fifth body panel 20e joins the first panel 20a along a second longitudinal joint 33.

Figures 2A, 2B, 2C:
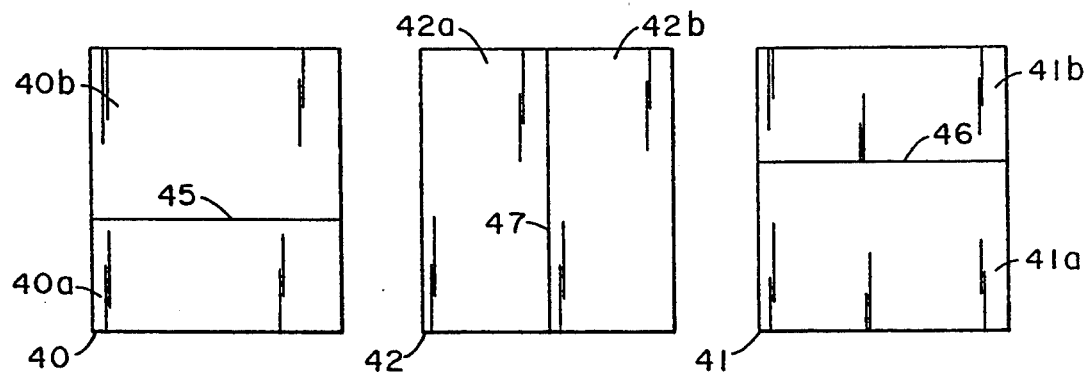
FIGS. 2A, 2B and 2C are top plan views of metal layers for making a spliced laminate of the invention.
Figure 3A:
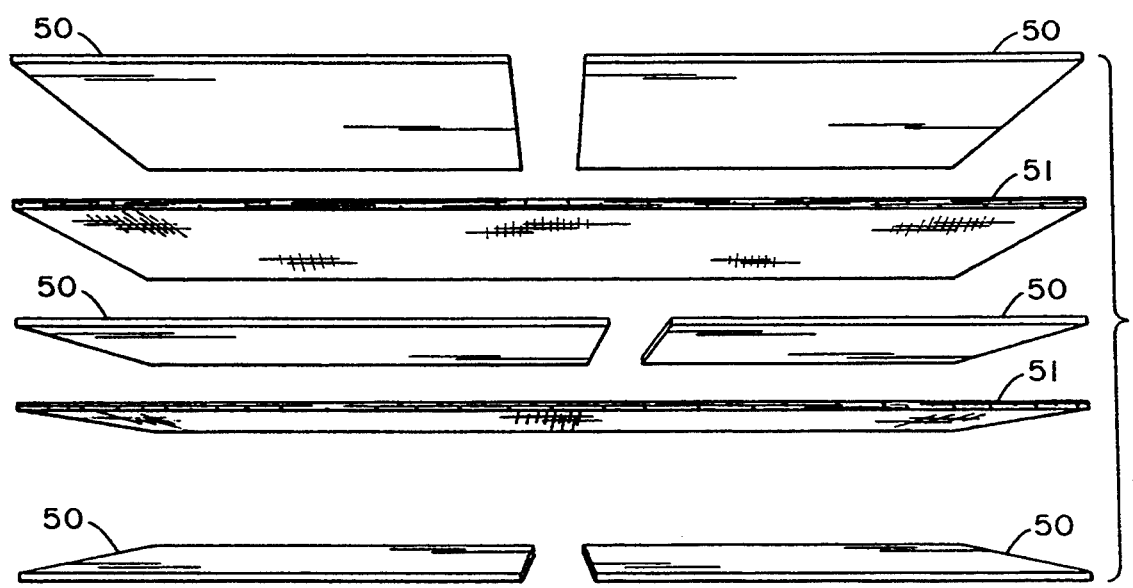
FIGS. 3A, 4A and 5A are exploded perspective views of alternative spliced laminates of the invention.
Figure 3B:
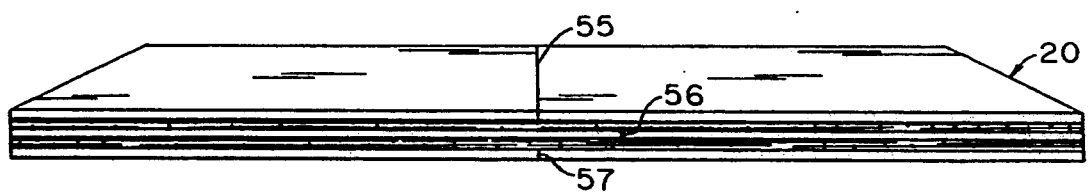
FIGS. 3B, 4B and 5B are assembled perspective views of the laminates of 3A, 4A and 5A, respectively.
Figure 4A:
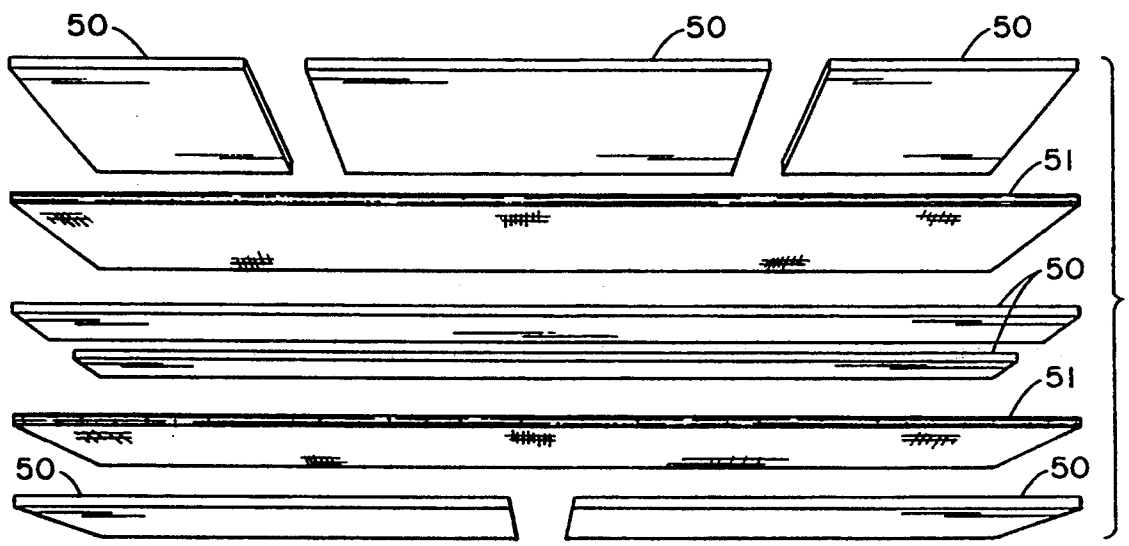
Figure 4B:
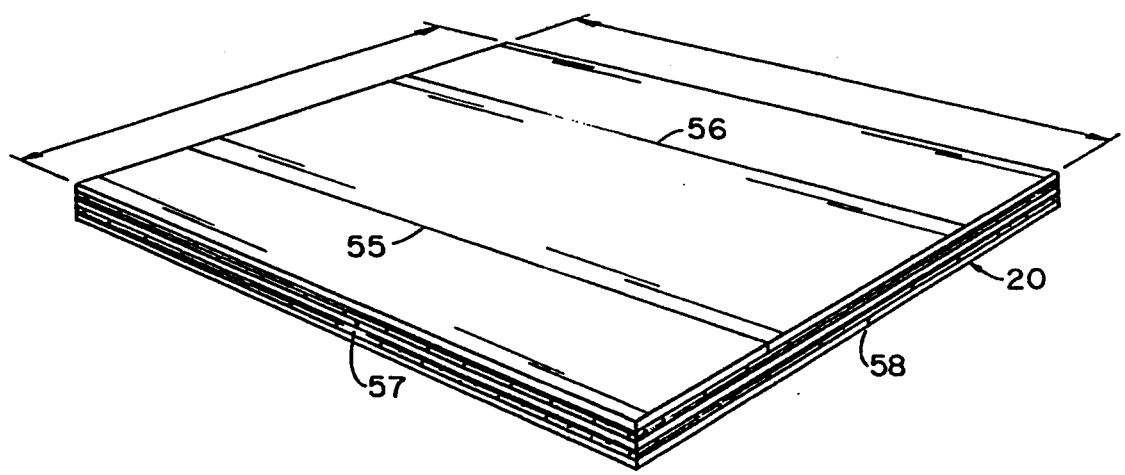
Figure 5A:
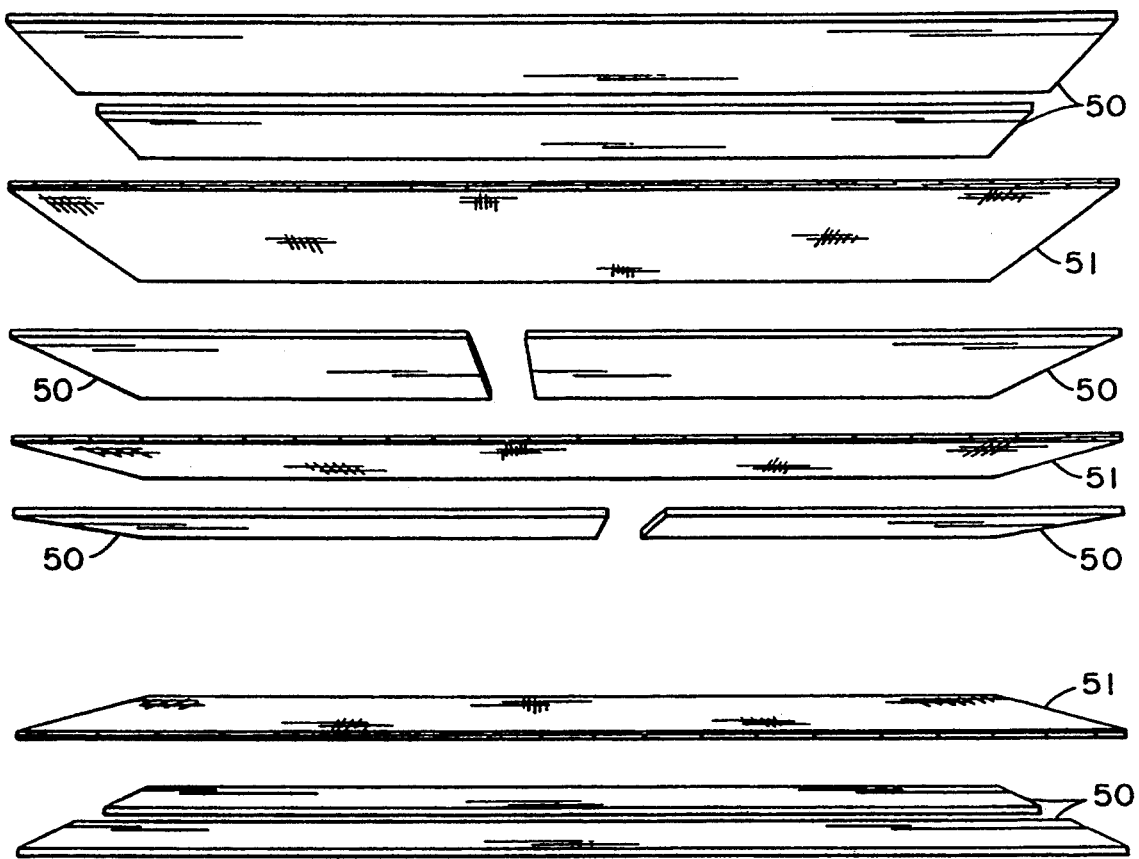
Figure 5B:
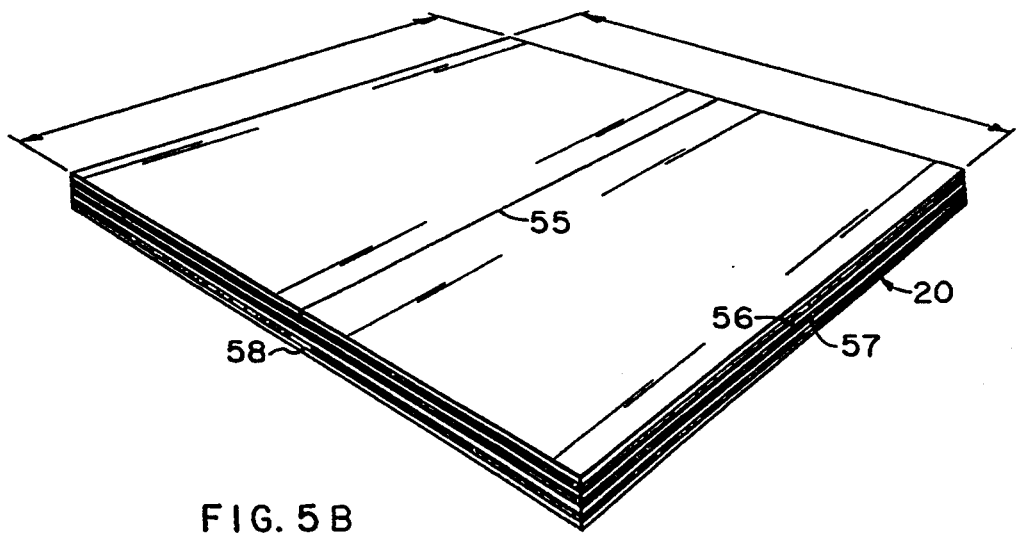

The spliced laminates of the invention are made up of alternating layers of metal and a fiber-reinforced adhesive. FIGS. 2A, 2B and 2C show configurations of some metal layers 40, 41, 42. The top metal layer 40 in FIG. 2A is made up of a first section 40a and a second section 40b separated by a first splice line 45. The bottom metal layer 41 in FIG. 2C is made up of a first section 41a and a second section 41b separated by a second splice line 46. A middle metal layer 42 in FIG. 2B includes a first section 42a and a second section 42b separated by a third splice line 47.

Some alternative embodiments of spliced laminates 20 made in accordance with the invention are shown in FIGS. 3A, 3B, 4A, 4B, 5A and 5B. The laminates shown therein are all made up of alternating metal layers 50 and adhesive layers 51. The metal layers 50 are made of sections separated by splice lines 55, 56, 57, 58. The metal layers are sheets of a 2024-T3 aluminum-copper alloy having a thickness of 0.3 mm (0.012 inch). The adhesive layers contain an AF-163 epoxy resin reinforced with S-2-glass fibers. About half of the fibers extend in a 0° (longitudinal) direction and about half extend in a 90° (circumferential) direction. FIG. 6 shows another laminate 20 made up of alternating spliced metal layers 50 and adhesive layers 51.

There is shown in FIG. 7 a stringer 24 attached to a spliced body panel 20 of the invention. The panel 20 includes a first metal layer 61, a second metal layer 62 and a third metal layer 63 between the other layers 61, 62. The panel 20 also includes fiber reinforced adhesive layers 64, 65.

The third metal layer 63 includes sections 63a and 63b separated by a splice line 70.

The stringer 24 is attached to the panel 20 by means of rivets or through fasteners 71, 72 extending through opposed lateral sides of the base 54a, 54b positioned on opposed sides of the third splice line 70.

FIG. 8 shows a specimen of a spliced laminate 80 which was tested for fatigue behavior. The laminate 80 includes a spliced front metal layer 81, a spliced back metal layer 82 and an unspliced middle metal layer 83. The metal layers 81, 82, 83 each comprise 2024-T3 aluminum-copper alloy sheets having a thickness of 0.3 mm. The metal layers 81, 82, 83 are sized at 300 mm in a longitudinal direction L and 100 mm in a transverse direction T.

Adhesive layers 91, 92 between the metal layers 81, 82, 83 comprise an epoxy resin reinforced with S-2-glass fibers. About one-half of the fibers extend in the longitudinal (300 mm) direction and one-half of the fibers extend in the 100 mm (transverse) direction. The adhesive layers 91, 92 also have a thickness of about 0.3 mm.

FIG. 9 shows a test laminate 90 similar to the one in FIG. 8, except that there are five metal layers 81, 82, 83, 84, 85 and four adhesive layers 91, 92, 93, 94.

The spliced laminates 80, 90 each include a front side or front wall 81 divided into a center section 81a and lateral sections 81b, 81c. Similarly, the back wall or back side 82 is divided into a center section 82a flanked by lateral sections 82b, 82c. The spliced center sections 81a, 82a each have a width W of 20 mm. The lateral sections 81b, 81c, 82b, 82c are each 40 mm wide.

Fatigue behavior of these laminates 80, 90 was measured by providing the center sections 81a, 82a with transversely extending saw cuts to simulate cracks. The specimens were then subjected to fatigue loads of 6–120 MPa, and crack length was measured as a function of the number of fatigue cycles. Measurements were performed on both spliced and unspliced laminates.

Figure 10:
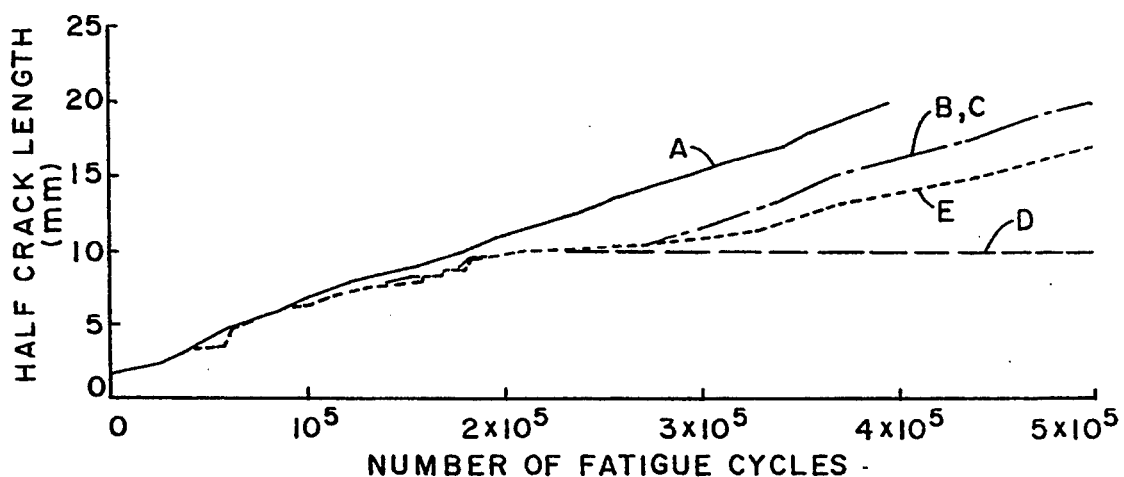
FIG. 10 is a graph showing fatigue behavior of the laminate of FIG. 8.

Fatigue test results for the laminate 80 of FIG. 8 are shown in FIG. 10. Fatigue behavior of the FIG. 9 laminate 90 is plotted in FIG. 11.

Figure 11:
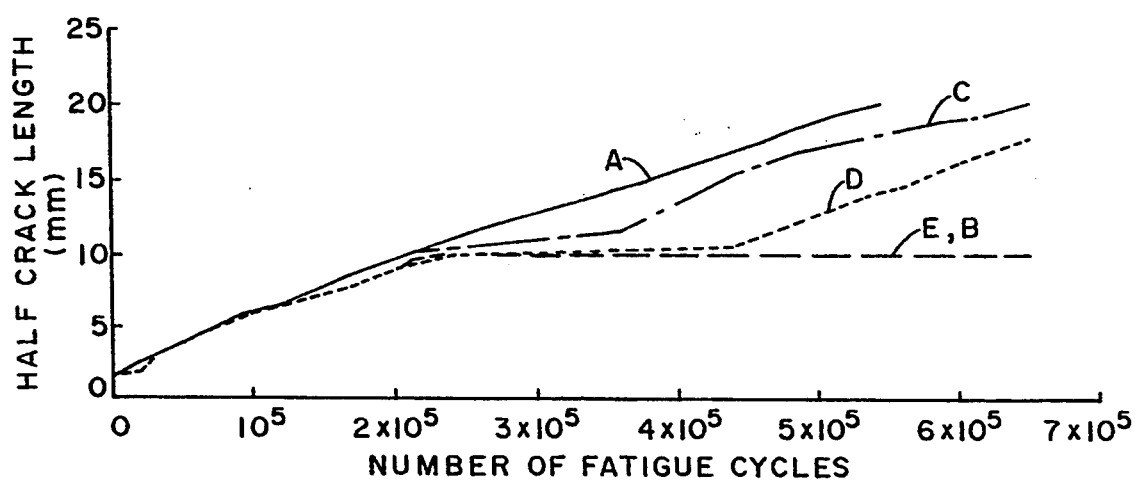
FIG. 11 is a graph showing fatigue behavior of the laminate of FIG. 9.

The fatigue behavior of several different test specimens is plotted in FIGS. 10 and 11. Plot A represents an average of the unspliced laminates. Specimens B, C, D and E were all spliced. Crack locations on the center sections of the spliced laminates were as follows; B-front side, left; C-front side, right; D-back side, left; and E-back side, right.

Fatigue behavior shown in FIGS. 10 and 11 is similar for both spliced and unspliced laminates up to about 20,000 fatigue cycles. Surprisingly, however, after 20,000 cycles, the spliced laminates all demonstrated reduced crack growth compared with the unspliced specimens.

Figure 12:
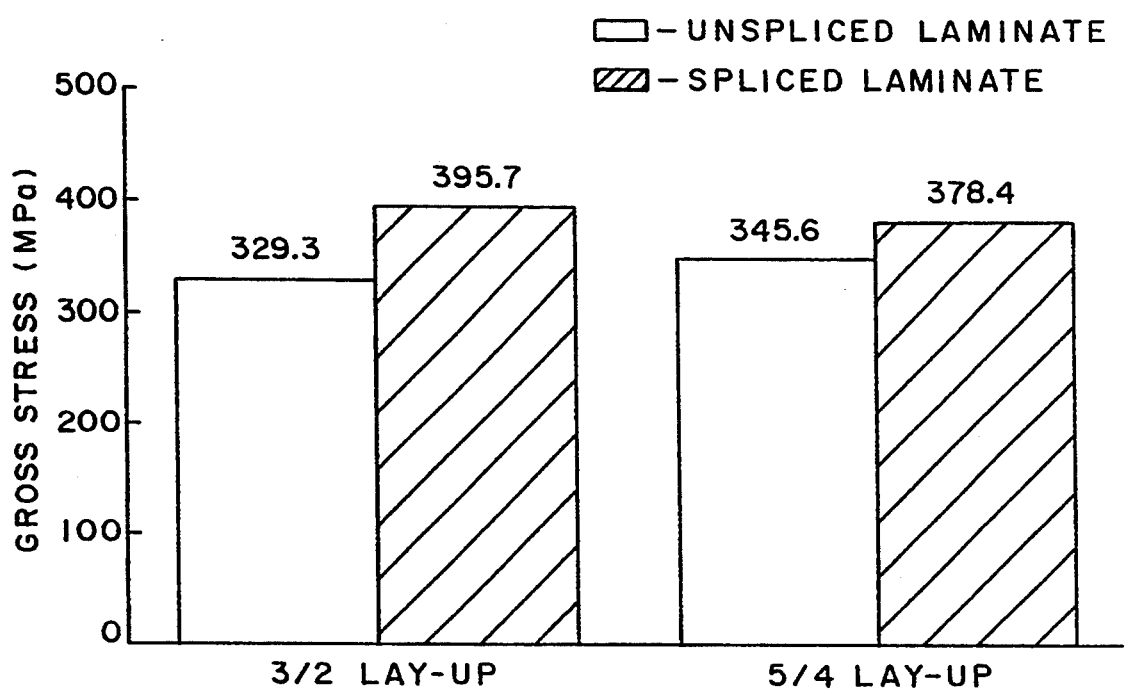
FIG. 12 is a graph showing residual strength of spliced and unspliced laminates.

Residual strength of the spliced laminates 80, 90 of FIGS. 8 and 9 was also tested by measuring gross stress to failure in the longitudinal (300 mm) direction for both spliced and unspliced laminates. Test results are shown in FIG. 12. Surprisingly, the 3/2 laminate 80 had a residual strength of 395.7 MPa compared with 329.3 MPa for an unspliced laminate. Similarly, the 5/4 laminate 90 had a residual strength of 378.4 MPa compared with 345.6 MPa for an unspliced 5/4 laminate.

Although the present invention is principally directed at production of wide (greater than about 165 cm) panels, it may be desirable to produce narrower spliced panels in order to take advantage of their enhanced residual strength. Spliced panels of the invention will generally have a width of at least about 100 cm (39 in), preferably in the range of about 250 cm to 400 cm (98 in to 157 in). The maximum width presently contemplated is approximately 800 cm (315 in).

The foregoing detailed description of a particularly preferred embodiment of the invention has been made for illustrative purposes only. Persons skilled in the art will understand that numerous changes and adaptations can be made therein without departing from the spirit and scope of the following claims.

What is claimed is:

1. A laminated panel comprising at least:
   (a) a first metal layer having a thickness of less than about 1 mm and comprising a first section, a second section generally coplanar with the first section and a first splice line between the first and second sections;
   (b) a second metal layer having a thickness of less than about 1 mm and comprising a first section, a second section generally coplanar with the first section and a second splice line between the first and second sections, the second splice line being spaced laterally from the first splice line by at least several centimeters; and
   (c) a fiber reinforced adhesive layer between the first and second metal layers.

2. The panel in accordance with claim 1 comprising 2 to about 20 metal layers and 1 to about 19 adhesive layers.

3. The panel in accordance with claim 1 wherein said first and second splice lines are generally parallel.

4. The panel in accordance with claim 1 wherein said metal layers have first and second lateral edges on opposite lateral sides of said splice lines, said first and second lateral edges being separated by a width of at least about 165 cm.

5. The panel in accordance with claim 4 wherein said width amounts to at least about 200 cm.

6. The panel in accordance with claim 4 wherein said width is at most 800 cm.

7. The panel in accordance with claim 4 wherein said width is between 250 and 400 cm.

8. The panel in accordance with claim 1 having a rectangular shape with a length and a width and wherein the splice lines are generally parallel to the longer of the length and the width.

9. The panel in accordance with claim 1 wherein at least a substantial portion of said fibers extends generally perpendicular to said first and second splice lines.

10. The panel in accordance with claim 9 wherein said portion of the fibers bridge across said first and second splice lines.

11. The panel in accordance with claim 1 wherein at least a substantial portion of said fibers extends generally parallel to said first and second splice lines.

12. The panel in accordance with claim 1 wherein a first group of said fibers extends generally parallel to said first and second splice lines and a second group of said fibers extends generally perpendicular to said first and second splice lines.

13. The panel in accordance with claim 1 wherein said fibers are generally continuous.

14. The panel in accordance with claim 1 wherein said first splice line extends generally perpendicular to said second splice line.

15. The panel in accordance with claim 1 wherein the metal layers each have a thickness of 0.1–0.9 mm.

16. The panel in accordance with claim 1 wherein the metal layers each have a thickness of 0.2–0.5 mm.

17. The panel in accordance with claim 1 wherein the thickness of each fiber reinforced adhesive layer is generally of the same order of magnitude as the thickness of individual metal layers.

18. The panel in accordance with claim 1 wherein the fibers constitute 35–75 vol. % of the total volume of adhesive and fibers combined.

19. The panel in accordance with claim 1 wherein said metal layers are made from one or more metals selected from the group consisting of aluminum alloys, steel alloys, copper alloys, zinc alloys, titanium alloys, magnesium alloys and aluminum alloy matrix composites.

20. The panel in accordance with claim 1 wherein said metal layers are made from a metal having a tensile strength of more than 0.20 GPa.

21. The panel in accordance with claim 1 wherein said fibers are made from one or more materials selected from the group consisting of glass, E-glass, R-glass, S2-glass, aramids, poly-paraphenyleneterephthalamide and carbon.

22. The panel in accordance with claim 1 wherein said fibers are made from a material having a modulus of elasticity of 60–650 GPa and an elongation at break of 0.2–8%.

23. The panel in accordance with claim 13 wherein said fibers are generally continuous filaments each having a diameter of 3–30 μm.

24. The panel in accordance with claim 1 wherein one or more metal layers each comprise 3–15 coplanar sections with parallel splice lines between the sections.

25. An aircraft fuselage or empennage which is at least partly built up of the laminated panel according to claim 1.

26. An aircraft wing which is at least partly built up of the laminated panel according to claim 1.

27. A laminated panel comprising at least:

(a) a first aluminum alloy layer having a thickness of less than about 1 mm and comprising a first section, a second section generally coplanar with the first section and a first splice line between the first and second sections;

(b) a second aluminum alloy layer having a thickness of less than about 1 mm and comprising a first section, a second section generally coplanar with the first section and a second splice line between the first and second sections, the second splice line being generally parallel to the first splice line and spaced laterally therefrom by at least several centimeters; and (c) an adhesive layer between the first and second aluminum alloy layers, said adhesive layer comprising a synthetic polymer reinforced with fibers comprising a material selected from the group consisting of glass, E-glass, R-glass, S2-glass, aramids, poly-paraphenyleneterephthalamide and carbon.

28. The panel in accordance with claim 27 wherein said first and second splice lines are generally parallel.

29. The panel in accordance with claim 27 wherein said metal layers have first and second lateral edges on opposite lateral sides of said splice lines, said first and second lateral edges being separated by a width of at least about 165 cm.

30. The panel in accordance with claim 29 wherein said width amounts to at least about 200 cm.

31. The panel in accordance with claim 29 wherein said width is at most 800 cm.

32. The panel in accordance with claim 29 wherein said width is between 250 and 400 cm.

33. The panel in accordance with claim 27 having a rectangular shape with a width and a length longer than the width, said splice lines being generally parallel to the length.

34. The panel in accordance with claim 27 wherein at least a substantial portion of said fibers extends generally perpendicular to said first and second splice lines.

35. The panel in accordance with claim 34 wherein said substantial portion of the fibers bridge across said first and second splice lines.

36. An aircraft fuselage or empennage at least partially built up of the laminated panel of claim 27.

37. An aircraft wing at least partially built up of the laminated panel of claim 27.

* * * * *